US012782049B2

(12) United States Patent
Stern et al.

(10) Patent No.: US 12,782,049 B2
(45) Date of Patent: Nov. 3, 2026

(54) METHOD AND DEVICE FOR THERMAL DRYING TREATMENT OF ELECTRODE-SEPARATOR ASSEMBLIES BY INDUCTION

(71) Applicant: VARTA MICROBATTERY GMBH, Ellwangen Jagst (DE)

(72) Inventors: Rainer Stern, Nordhausen (DE); Dieter Kloos, Fichtenau (DE); Martin Elmer, Ellwangen (DE)

(73) Assignee: VARTA MICROBATTERY GMBH, Ellwangen Jagst (DE)

( * ) Notice: Subject to any disclaimer, the term of this patent is extended or adjusted under 35 U.S.C. 154(b) by 327 days.

(21) Appl. No.: 18/727,717

(22) PCT Filed: Jan. 20, 2023

(86) PCT No.: PCT/EP2023/051456

§ 371 (c)(1),
(2) Date: Jul. 10, 2024

(87) PCT Pub. No.: WO2023/139245

PCT Pub. Date: Jul. 27, 2023

(65) Prior Publication Data

US 2025/0102223 A1 Mar. 27, 2025

(30) Foreign Application Priority Data

Jan. 20, 2022 (EP) .................................... 22152468

(51) Int. Cl.
*F26B 3/347* (2006.01)
*H01M 10/0587* (2010.01)
*H05B 6/36* (2006.01)

(52) U.S. Cl.
CPC ......... *F26B 3/347* (2013.01); *H01M 10/0587* (2013.01); *H05B 6/36* (2013.01)

(58) Field of Classification Search
CPC ............ F26B 3/347; F26B 5/04; F26B 13/10; H01M 10/0587; H01M 50/609;
(Continued)

(56) References Cited

U.S. PATENT DOCUMENTS

2001/0037895 A1* 11/2001 Gotoh ..................... H03H 3/00
174/250
2004/0208222 A1 10/2004 Fishman et al.
(Continued)

FOREIGN PATENT DOCUMENTS

CN 112197512 A 1/2021
DE 102017213384 A1 2/2019
(Continued)

*Primary Examiner* — David J Laux
(74) *Attorney, Agent, or Firm* — Leydig, Voit & Mayer, Ltd.

(57) ABSTRACT

A method is provided for thermal drying treatment of electrode-separator assemblies having a negative electrode and a positive electrode. The method includes positioning the electrode-separator assemblies in a drying device in an effective range of a plurality of inductors configured to inductively heat the plurality of electrode-separator assemblies. The method further includes applying a vacuum for the thermal drying treatment and supplying a current to the inductors. Exactly one inductor is assigned to each electrode-separator assembly to be dried or more than two electrode-separator assemblies are assigned to an inductor that generates an alternating magnetic field of elongate extension in which the more than two electrode-separator assemblies can be arranged so that they are each exposed to essentially the same magnetic field strength in the alternating field.

14 Claims, 4 Drawing Sheets

(58) Field of Classification Search
CPC ......... H01M 10/0422; H01M 10/0431; H01M 10/0525; H05B 6/36
See application file for complete search history.

(56) References Cited

U.S. PATENT DOCUMENTS

| | | | | |
|---|---|---|---|---|
| 2008/0050295 | A1 | 2/2008 | Uchida et al. | |
| 2018/0283783 | A1* | 10/2018 | Okumura | C04B 35/478 |
| 2018/0283784 | A1* | 10/2018 | Okumura | C04B 38/0006 |
| 2018/0283785 | A1* | 10/2018 | Okumura | B28B 11/243 |
| 2019/0132910 | A1 | 5/2019 | Delmas et al. | |
| 2024/0120523 | A1* | 4/2024 | Elmer | H01M 50/103 |

FOREIGN PATENT DOCUMENTS

| | | | |
|---|---|---|---|
| EP | 3439079 | B1 | 2/2019 |
| JP | 2004303560 | A | 10/2004 |
| JP | 2005100838 | A | 4/2005 |
| JP | 2006004883 | A | 1/2006 |
| JP | 4292453 | B2 | 7/2009 |
| JP | 2015125946 | A | 7/2015 |
| WO | WO 2017/215900 | A1 | 12/2017 |
| WO | WO 2019089115 | A1 | 5/2019 |

* cited by examiner

METHOD AND DEVICE FOR THERMAL DRYING TREATMENT OF ELECTRODE-SEPARATOR ASSEMBLIES BY INDUCTION

CROSS REFERENCE TO RELATED APPLICATIONS

This application is a U.S. National Phase application under 35 U.S.C. § 371 of International Application No. PCT/EP2023/051456, filed on Jan. 20, 2023, and claims benefit to European Patent Application No. EP 22152468.9, filed on Jan. 20, 2022. The International Application was published in German on Jul. 27, 2023 as WO 2023/139245 under PCT Article 21(2).

FIELD

The present disclosure relates to a method for thermal drying treatment of a plurality of electrode-separator assemblies and to a drying device for carrying out the method.

BACKGROUND

Electrochemical energy storage elements can convert stored chemical energy into electrical energy through virtue of a redox-reaction. The simplest form of an electrochemical energy storage element is the electrochemical cell. It comprises a positive electrode and a negative electrode, which are separated from each other by a separator. During a discharge, electrons are released at the negative electrode as a result of an oxidation process. This results in an electron current that can be drawn off by an external electrical consumer, for which the electrochemical cell serves as an energy supplier. At the same time, an ion current corresponding to the electrode reaction occurs within the cell. This ion current crosses the separator and is made possible by an ion-conducting electrolyte.

If the discharge of the electrochemical energy storage element is reversible, i.e. it is possible to reverse the conversion of chemical energy into electrical energy during discharge and charge the cell or element again, this is said to be a secondary energy storage element. The common designation of the negative electrode as the anode and the designation of the positive electrode as the cathode for secondary energy storage elements refers to the discharge function of the electrochemical energy storage element.

In the present case, the term "electrochemical energy storage element" is understood to mean not only a single electrochemical cell, but also a battery comprising a plurality of individual electrochemical cells.

Among the known secondary electrochemical energy storage elements, comparatively high energy densities are achieved in particular by lithium-ion cells. In addition to the use of cell stacks consisting of several individual cells, each with at least one positive and at least one negative electrode, lithium-ion cells with a winding-shaped electrode-separator assembly are widely used. Such an assembly often has the sequence "positive electrode/separator/negative electrode". Furthermore, such individual cells can be constructed as so-called bi-cells with the possible sequences "negative electrode/separator/positive electrode/separator/negative electrode" or "positive electrode/separator/negative electrode/separator/positive electrode".

The electrodes of lithium-ion cells usually comprise metallic current collectors, which are usually in the form of foils, nets, grids, foams, fleeces or felts. In the case of the positive electrode, nets or foils made of aluminum, for example aluminum expanded metal or aluminum foil, are usually used as current collectors. On the negative electrode side, nets or foils made of copper are usually used as current collectors.

Generally, the cells described for lithium-ion cells are produced in a multi-stage method. It is common for the electrodes to be produced in a first step, which are then combined with one or more separators to form the aforementioned electrode-separator assemblies. Electrodes and separators can be loosely stacked or wound or can also be connected to each other in a lamination step.

To produce the electrodes for lithium-ion cells, thin electrode films are formed on the current collectors from mostly paste-like compositions comprising a suitable electrochemically active material (in short: "active material"), for example using a doctor blade or a slot die. Active materials suitable for the electrodes of a lithium-ion cell must be able to absorb and release lithium ions, which migrate from the negative to the positive electrode (and vice versa) during charging and discharging.

Graphitic carbon or non-graphitic carbon materials capable of intercalating lithium are suitable active materials for the negative electrodes of lithium-ion cells. Metallic and semi-metallic materials that can be alloyed with lithium can also be used. For example, the elements tin, antimony and silicon can form intermetallic phases with lithium. In particular, the carbon-based active materials can also be combined with the metallic and/or semi-metallic materials.

Lithium cobalt oxide (LCO) with the chemical formula $LiCoO_2$, lithium nickel manganese cobalt oxide (NMC) with the chemical formula $LiNi_xMn_yCo_zO_2$, lithium manganese spinel (LMO) with the chemical formula $LiMn_2O_4$, lithium iron phosphate (LFP) with the chemical formula $LiFePO_4$ or lithium nickel cobalt aluminum oxide with the chemical formula $LiNi_xCo_yAl_zO_2$ (NCA) are suitable for positive electrodes. Mixtures of these materials can also be used.

In addition to the active materials, the usually paste-like compositions generally also contain an electrode binder ("binder" for short), a conductivity improver, a solvent and/or suspending agent and, if necessary, additives, for example to influence their processing properties. An electrode binder forms a matrix in which the active material and possibly the conductivity improver can be embedded. The matrix is intended to ensure elevated structural stability during volume expansions and contractions caused by lithiation and delithiation. Possible solvents and/or suspending agents include water or organic solvents such as N-methyl-2-pyrrolidone (NMP) or N-ethyl-2-pyrrolidone (NEP). An example of an aqueous processable binder is sodium carboxymethyl cellulose (Na-CMC). An example of a binder that can be processed in organic solvents is polyvinylidene difluoride (PVDF). Rheology aids, for example, can be added as additives. The conductivity improver is usually an electrically conductive carbon-based material, in particular conductive carbon black, conductive graphite, carbon fibers or carbon nanotubes.

Solvents and/or suspending agents contained in the compositions are usually found in the electrode films formed on the current collectors and must be removed from them. The dry electrode films can then be compacted, for example in a calendering process. The electrodes formed in this way can be assembled into the cells mentioned above.

The drying of electrode films formed on current collectors, i.e. the removal of the solvent and/or suspending agent contained in the electrode films, as well as the removal of any residual moisture that may still be present later in the electrode-separator assemblies, is time-consuming and energy-intensive. Traditionally, the electrode films can be dried using a tempered gas, in particular tempered air. The gas heats the electrode film so that any solvent and/or suspending agent it contains or any residual moisture evaporates and escapes. The heating initially takes place on the surface of the electrode film and then gradually spreads into the interior of the film. Accordingly, drying also progresses gradually from the outside to the inside; an outer layer of the electrode film may already be dry while the electrode film still contains considerable amounts of solvent and/or suspending agent in a layer adjacent to the current collector. This can be problematic in that a film-like residue often remains when the solvent and/or suspending agent is removed. If this residue is formed in an outer layer of the electrode film, it can significantly delay further drying of the electrode film, as the solvent and/or suspending agent can no longer protrude from the layer adjacent to the current collector without problems. Under certain circumstances, even bubbles may form. In particular, attempts are made to counteract this by sufficiently long drying times. With slow drying, the observed drying gradient only occurs to a small extent. However, deliberately slowing down the drying process elevates the already considerable amount of time required.

As part of the manufacturing process for lithium-ion cells, it is important to remove any residual moisture from the electrode-separator assemblies before filling the cell with electrolyte. Traditionally, this is done via an oven process, generally using vacuum ovens in which either the electrodes are dried before the winding process or the winding-shaped electrode-separator assemblies are dried in a housing cup directly before filling with electrolyte. For mass production, a batch, which generally consists of several hundred cells, is usually heated to around 100° C. in a carrier (tray) for several hours so that any moisture present is removed. This usually involves several cycles of vacuum and nitrogen purging to remove the moisture from the oven chamber.

However, this procedure is associated with various challenges. Firstly, it is generally difficult to introduce heat into such an oven, as no drying medium can be circulated in a vacuum. Simultaneous and homogeneous heating of the cells is therefore difficult. Uniform heating is only possible if nitrogen or another gas is added.

It is also problematic that in such a conventional oven process, heating takes place via contact heating, e.g. by placing the cells on a hot carrier plate of the oven. In a vacuum, unevenness between the plate and the cells can interfere with heat transfer, as there is no heat transfer by convection in a vacuum and the vacuum even has an insulating effect. This can easily lead to uneven heating of the cells.

In a conventional oven process, it should also be noted that the cells must not be heated too excessively, as otherwise damage to the cells, in particular damage to the separator, can occur. This is difficult when heating using a conventional heating plate due to the heat and time losses that occur, so that the temperature sometimes overshoots, which can be associated with quality losses in the cells to be dried.

In a conventional oven process, it is also problematic if an electrode-separator assembly that is already in a cell cup or housing cup is to be dried in the oven. In this case, the cell cup is heated first and foremost. Direct heat conduction to the electrodes and current collectors takes place primarily via welding points on the electrodes or via any metal contact plates present. This results in poor heat transfer. In addition, there is often a small free space between the inside of the can and the electrode-separator assembly, which further inhibits heat transfer.

Finally, in a conventional oven process, it is difficult to achieve homogeneity of drying treatment across the entire batch of cells. In general, cells on the outside of a batch reach a different temperature than the cells on the inside during the drying process. On the one hand, the temperature must not be too high during the drying treatment in order to avoid damaging the separator in particular. On the other hand, the temperature must not be too low so that the moisture evaporates safely. Overall, the temperature window to be maintained is very small and it is difficult to achieve the required temperature window for a sufficient period of time for all cells in the batch.

It is already known that electrodes can be dried by heating them using inductively generated eddy currents. For example, EP 3 439 079 B1 describes a method for the thermal treatment of electrode films on a metallic current collector, in which the current collector is inductively heated by means of an induction device. However, the method described there primarily provides a solution for drying electrode strips immediately after they have been coated. For simultaneous drying of a plurality of already wound electrode-separator assemblies, no satisfactory results can be expected with this method.

SUMMARY

In an embodiment, the present disclosure provides a method for thermal drying treatment of a plurality of electrode-separator assemblies. Each of the plurality of electrode-separator assemblies has at least one negative electrode and at least one positive electrode. Each negative electrode and each positive electrode includes a metallic current collector coated with electrode active material. The method includes positioning the plurality of electrode-separator assemblies in a drying device in an effective range of a plurality of inductors configured to inductively heat the plurality of electrode-separator assemblies. The method further includes applying a vacuum for the thermal drying treatment and supplying a current to the inductors. Exactly one inductor is assigned to each electrode-separator assembly of the plurality of electrode-separator assemblies to be dried in the drying device, or more than two electrode-separator assemblies are assigned to an inductor that generates an alternating magnetic field of elongate extension in which the more than two electrode-separator assemblies can be arranged so that they are each exposed to essentially the same magnetic field strength in the alternating field.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
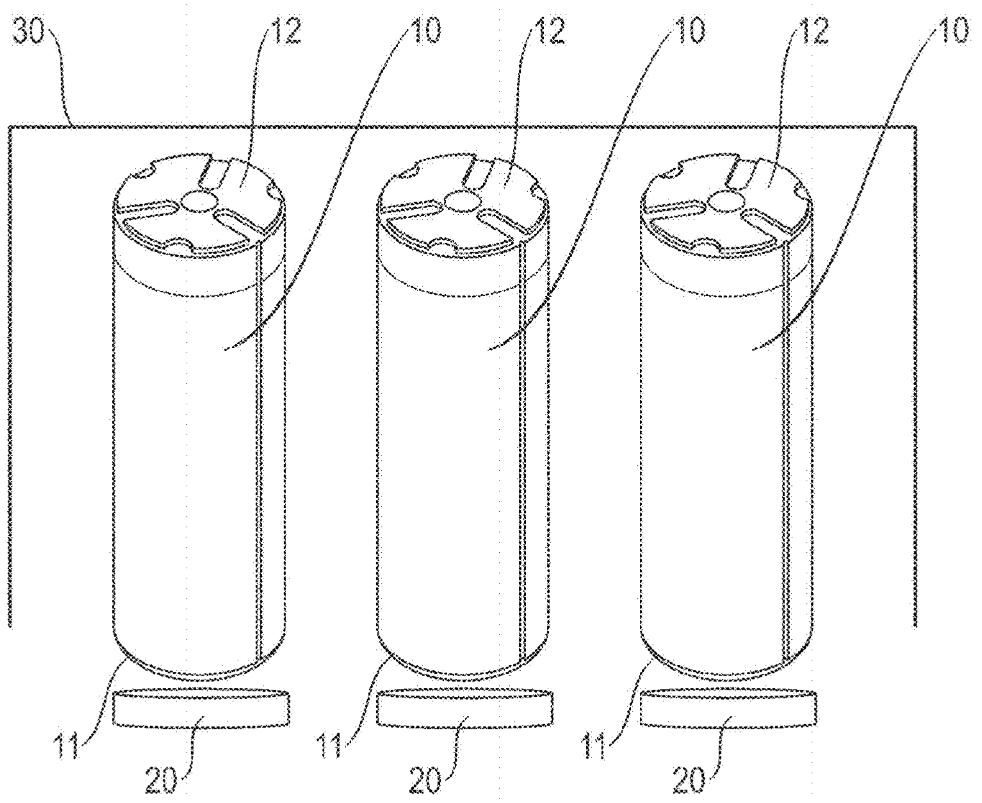
FIG. 1 provides a schematic representation of components involved in a method according to the present disclosure.

The present disclosure provides an improved method and a corresponding device for drying electrode-separator assemblies, with which a rapid and uniform drying of a large number of electrode-separator assemblies and, in particular, a removal of residual moisture can be carried out as part of the manufacturing process of lithium-ion energy storage elements. In addition, the method should be faster and more effective compared to conventional processes and at the same time enable energy savings.

The present disclosure provides a method according to a first aspect and a drying device according to a second aspect.

The method according to the first aspect is used for the simultaneous thermal drying treatment of a plurality of electrode-separator assemblies. The plurality of electrode-separator assemblies can be dried simultaneously, in particular in the form of a batch.

The electrode-separator assemblies each comprise at least one positive and at least one negative electrode and at least one separator. The electrodes themselves each comprise a metallic current collector coated with electrode active material. In the case of the negative electrode, this is an anode current collector and in the case of the positive electrode, it is a cathode current collector. The thermal drying treatment is carried out by means of inductors, preferably contactless. The electrode-separator assemblies are preferably heated inductively at the same time, without direct contact with the inductors.

The method comprises the following steps:

a. The plurality of electrode-separator assemblies is positioned in a drying device in the effective range of the inductors,
b. a vacuum is applied for the thermal drying treatment, and
c. a current is supplied to the inductors.

The method is further characterized in that d. exactly one inductor is assigned to each of the electrode-separator assemblies to be dried in the drying device or e. more than two electrode-separator assemblies are assigned to an inductor which generates an alternating magnetic field of elongate extension, in which the more than two electrode-separator assemblies can be arranged so that they are each exposed to substantially the same magnetic field strength in the alternating field.

The method is based on the generation of an alternating magnetic field by the inductor, which can act on the metallic components of the electrode-separator assemblies, in particular on the current collectors. The generated eddy currents in the metallic components lead to heating, which in turn causes any moisture present in the electrode films deposited on the current collectors to evaporate. Compared to conventional oven processes, heating is much more direct and faster, so that the method saves a considerable amount of time.

According to the inductive principle of the method, an alternating current is supplied to the inductors. Depending on the frequency and/or amplitude of the alternating current, the temperature during the drying treatment can be set as desired.

Both the embodiment according to feature d. above and the embodiment according to feature e. above ensure that the electrode-separator assemblies to be dried are exposed to identical drying conditions, so that drying can take place uniformly and quickly.

The vacuum is applied in a known manner, as is also known from conventional oven processes, for example. In particular, a vacuum pump is used for this purpose, which generates a vacuum, i.e. a pressure that is lower than the ambient pressure. Preferably, a pressure below 300 mbar is set, for example a pressure in a range from 20 mbar to 100 mbar.

In contrast to conventional drying methods for electrodes on an inductive basis, the core of the method in an embodiment with the above feature d. lies above all in the fact that each electrode-separator assembly to be dried is assigned to an inductor in order to achieve a very targeted and directed heating of the electrode-separator assembly. In this way, any residual moisture present in the electrode-separator assembly can be removed safely and in a short time in an effective and at the same time energy-saving manner.

The core of the method in an embodiment with the above feature d. achieves the same effect, except that here several electrode-separator assemblies can be assigned to one inductor and are exposed to identical drying conditions. With a magnetic field generated by a coil with a circular cross-section, it is difficult to position several coils such that they are exposed to almost identical magnetic field forces. An elongated magnetic field, as can be generated by an equally elongated inductor, makes this possible.

It is possible to build such inductors in a length that enables a dozen or more electrode-separator assemblies arranged in a row to be dried evenly.

A drying device preferably comprises more than one such elongated inductor, on which several electrode-separator assemblies can be arranged.

The method in an embodiment with the above feature d. can be individually controlled and/or regulated for individual electrode-separator assemblies, if necessary, so that no damaging excess temperatures occur in individual cells. Furthermore, the method achieves a high degree of homogeneity of heating over an entire batch, since mechanical and magnetic tolerances can be compensated for by the individual heating of the individual electrode-separator assemblies via individual inductors. Each electrode-separator assembly in the batch can be heated and dried evenly so that hotspots or other uneven heat distributions do not form in the batch.

Compared to conventional drying ovens, the construction of a corresponding drying device is also much lighter and requires less material. In particular, no conductive medium, such as oil or water, is required, which can be used to heat the oven drawers in conventional oven processes.

Further, the method allows, in principle, different drying curves for different types of electrode-separator assemblies to be run in a drying device, for example drying curves for one energy type and other drying curves for one power type in the electrode-separator assemblies, since the individual inductors can be operated individually.

Above all, the method allows significant energy savings compared to conventional methods. In comparison with a conventional oven process, in which generally carrier means for the cells, e.g. pallets, also have to be heated, energy savings in a range from 50% to 75% are possible.

To introduce and position the electrode-separator assemblies, the individual electrode-separator assemblies can, for example, be pushed directly into the drying device and positioned in the effective range of the respective inductor. The use of a carrier pallet as in conventional processes is not absolutely necessary, so that the step of storing and transferring the electrode-separator assemblies into and out of the carrier pallets is eliminated. As the inductor transfers the energy required for contactless drying, the quality requirements, in particular the evenness of the surface on which the electrode-separator assemblies are arranged, can be relatively low. Due to the contactless transfer, any existing unevenness is irrelevant. In the case of contact heat, however, the size of the contact surface is decisive.

In other preferred embodiments, product carriers, for example transport cups (pucks) or other carrier means, may be used. Conveniently, these product carriers are made of electrically non-conductive material, e.g. plastic, so that they do not interact with the inductive heating process and are not heated and therefore do not cause any energy losses.

In conventional oven processes, the use of carrier pallets is also disadvantageous with regard to the associated additional energy requirement during heating and cooling, since the carrier pallets are inevitably heated together with the electrode-separator assemblies to be treated. In the method, only the electrode-separator assemblies can be heated in a targeted manner. Even if product carriers are used, no heating of the product carriers takes place if the appropriate material is selected for the product carriers, so that the method is significantly more time- and energy-saving than conventional methods.

If the electrode-separator assemblies to be treated are introduced into the drying device directly or carried by individual product carriers, the electrode-separator assemblies can be accumulated on a surface with the inductors, in particular on a carrier plate of the drying device, such that the each of the individual electrode-separator assemblies is positioned above an inductor.

After positioning the electrode-separator assemblies to be treated, a vacuum hood can be lowered over the electrode-separator assemblies to be treated, for example, and the drying process can be started.

Once the heating process is complete, the individual electrode-separator assemblies can be conveyed further using a pusher, for example, and separated again. Compared to handling with a carrier pallet, this offers considerable advantages for the further processing of the electrode-separator assemblies.

In preferred embodiments, the method is characterized by at least one of the following additional features:

a. The electrode-separator assemblies are heated to a temperature above 99° C. and below the melting temperature of the separator of the electrode-separator assemblies.
b. The electrode-separator assemblies are heated to a temperature in a range from 100° C. to 110° C.

Preferably, the aforementioned features a. and b. are realized in combination with each other.

For effective heating, which leads to the evaporation of any residual moisture present, it is ideal to achieve a temperature above the boiling point of the moisture or residual moisture during drying treatment. It is therefore preferable to set a temperature of 100° C. or higher. It is expedient to select the desired temperature range such that the electrode-separator assemblies to be treated are not damaged. The critical component here is generally the separator, which can be made of microporous plastics or nonwovens made of glass fiber or polyethylene, for example. The separator can also consist of non-woven materials with a ceramic coating, for example. A temperature range of 100° C. to 110° C. is therefore suitable for drying treatment in order to reliably prevent damage to the electrode-separator assemblies.

Compared to conventional oven processes, the time required for drying treatment in the method can be significantly reduced by the targeted and effective heating of the electrodes.

In preferred embodiments, the method is characterized by at least one of the following additional features:

a. The electrode-separator assemblies are each formed as a winding and have a cylindrical basic shape with two terminal end faces.
b. The electrodes and their respective current collectors are ribbon-shaped and are spirally wound within the electrode-separator assemblies.

Preferably, the aforementioned features a. and b. are realized in combination with each other.

Since the method based on inductive heat transfer can be carried out much more directly and quickly than conventional methods and no contact heat is required as in conventional oven processes, the method can be used very flexibly in the manufacturing process of energy storage elements. In principle, the method can also be used for pure electrode drying. However, it is preferable to use the method to dry already wound electrode-separator assemblies.

In a preferred embodiment, the method is characterized by the following additional features:

a. The negative electrode and the positive electrode are arranged within the electrode-separator assemblies such that a longitudinal edge of the anode current collector protrudes from one of the terminal end faces and a longitudinal edge of the cathode current collector protrudes from the other of the terminal end faces.
b. A contact element, in particular a contact plate, is attached to at least one of the end faces and covers at least 50% of the respective end face.

Preferably, the aforementioned features a. and b. are realized in combination with each other.

The application of the drying treatment for energy storage elements in the per se known, so-called contact plate design according to the aforementioned features a. and b. offers particular advantages, since the contact element, for example a contact plate, which is in direct contact with one of the current collectors, significantly promotes inductive heating.

One such contact plate design can be found in WO 2017/215900 A1, for example. Cylindrical round cells with a winding-shaped electrode-separator assembly are described here. The oppositely polarized electrodes are arranged offset to one another within the electrode-separator assembly so that longitudinal edges of the current collectors of the positive electrodes protrude from one end face and longitudinal edges of the current collectors of the negative electrodes protrude from the other end face of the winding. For electrical contacting of the current collectors, the cell has a contact plate that sits on one end face of the winding and is assembled with a longitudinal edge of one of the current collectors, for example by welding. This makes it possible to electrically contact the current collector and thus also the associated electrode over its entire length. This can significantly reduce the internal resistance within the cell. Compared to conventional cells, the occurrence of large currents can be absorbed much better and heat can also be dissipated better from the winding.

The contact plate design of the electrode-separator assemblies, which can be dried according to the method, can be designed, for example, such that the contact element is designed in particular as a contact plate or as a metallic plate, whereby apertures in the plate can also be provided so that only a certain proportion of the respective end face is covered with the contact element, for example 50% or preferably more.

The contact element can, for example, consist of nickel or copper or titanium or a nickel or copper or titanium alloy or stainless steel or nickel-plated copper. These materials are preferred for a contact element that is assembled with the anode current collector. A contact element intended for connection to the cathode current collector preferably consists of aluminum or an aluminum alloy.

The contact element can, for example, have a uniform thickness in a range from 50 μm to 600 μm, preferably 150 μm to 350 μm. Preferably, the contact element has the shape of a disk or a polygonal plate. The contact element preferably covers 60% or more of the respective end face and may have an aperture, in particular a hole or a slot or, if necessary, several holes or slots.

The inventors were able to determine that, in the method, heating is much faster and more effective in an electrode-separator assembly with a contact element. This is presumably due, among other things, to the fact that the contact element provides more mass that can absorb the magnetic field lines. In addition, the contact element can be aligned favorably to the field lines. In combination with a contact element, the method therefore allows fast, effective and directed heating and thus drying of the electrode-separator assembly.

With regard to the positioning of the electrode-separator assemblies in the drying device, the method is characterized in preferred embodiments by at least one of the following additional features:

a. When positioning the electrode-separator assemblies in the drying device, the electrode-separator assemblies that are formed as windings are aligned parallel to one another on a carrier plate of the drying device, with one of the end faces of the winding facing the carrier plate and the other of the end faces of the winding facing away from the carrier plate.
b. The inductor or inductors are arranged in the carrier plate or under the carrier plate.
c. After the electrode-separator assemblies have been positioned in the drying device, the inductor or inductors are separated from the electrode-separator assemblies by a dielectric.

Preferably, the aforementioned features a. and b. and, in a preferred manner, the aforementioned features a., b. and c., are realized in combination with one another.

The carrier plate of the drying device is preferably a bottom or a base plate within the drying device, wherein the inductor or inductors for the electrode-separator assemblies are arranged in or under this bottom or the base plate or the carrier plate in general.

According to the aforementioned feature c., a dielectric, i.e. a non-conductor, is located between the electrode-separator assemblies and the inductors after the positioning. This can be a glass ceramic, for example, which covers the inductor or inductors in the carrier plate. According to the principle of inductive heating, heat is transferred via electromagnetic field lines that only induce heating in a metallic substrate, i.e. in particular in the current collectors and/or any contact elements of the electrode-separator assemblies. A covering glass ceramic or the like is therefore not heated in the method.

In a preferred manner, the electrode-separator assemblies are positioned such that one end face of the electrode-separator assemblies, which is preferably provided with a contact element, is aligned on the carrier plate or faces the carrier plate. It is preferred if the anodic side of the electrode-separator assembly faces the carrier plate with the inductors. In some embodiments, however, the cathodic side of the electrode-separator assembly may also face the carrier plate with the inductors.

Preferably, the anode-side contact element is placed on the carrier plate. Preferably, the contact element on the anode side consists of copper or nickel and/or the anode current collector is made of copper. This allows good inductive heating.

In principle, the method is also suitable for heating a contact element on the cathode side, which consists of aluminum, for example.

In further embodiments of the method, it may be provided that the electrode-separator assembly, with or without contact elements, is dried together with a housing cup, for example a metallic housing cup. In preferred embodiments, the method is therefore characterized by at least one of the following additional features:

a. The electrode-separator assemblies, that are designed as windings, are inserted into a metallic housing cup, which is cylindrical and has a cup base, and are inductively heated inside the housing cup.
b. To position the electrode-separator assemblies, the electrode-separator assemblies designed as windings are positioned together with the metal housing cup in the drying device so that the housing bottom of the housing cup stands on the carrier plate of the drying device.

Preferably, the aforementioned features a. and b. are realized in combination with each other.

Also combined with a housing cup a drying treatment can be carried out effectively. Heat that is inductively generated in the cup can also be transferred to the electrode-separator assembly, so that the effectiveness of the heating is further increased. In combination with one or two contact elements in the electrode-separator assembly, the effectiveness of the heating can be increased even further, as in this case the contact elements or the contact element arranged inside the cup are also heated inductively, so that the heat is also generated inside the cup. The energy supply is very direct due to the inductive method, so that only minimal electrical power is required to carry out the drying process optimally.

A drying treatment only for the electrode-separator assembly or only for the electrode-separator assembly with one or two contact elements has the particular advantage over heating the electrode-separator assembly within a cup that no energy has to be expended for heating the cup. This can be advantageous under certain circumstances. However, there are possible cases in which it is also favorable for production-related reasons to subject the electrode-separator assembly within the housing cup to the drying treatment. Since the method is generally very efficient and saves energy and time, this method also offers advantages compared to conventional methods.

A particular advantage of the method is that a very targeted and individually adjustable heating of the individual electrode-separator assemblies is possible via the individual inductors, which are each assigned to the electrode-separator assemblies to be treated. In preferred embodiments of the method, at least one of the following additional features is provided in this context:

a. The individual inductors are operated in a controlled manner.
b. At least one performance value is measured in the individual inductors.

Preferably, the aforementioned features a. and b. are realized in combination with each other.

Controlled operation of the individual inductors (in an according to feature d.) makes it possible to compensate for an uneven heat supply that may occur due to the arrangement in the batch, so that hotspots or other uneven heat distributions over the entire batch do not develop inside the batch, for example. In other embodiments, however, regulation can also be dispensed with. It may also be possible for several inductors to be switched and/or controlled together. In particular, this is so provided in an embodiment according to feature e.

With conventional methods, it is not possible to ensure that each individual electrode composite absorbs the same amount of heat within a batch. This can be due to unevenness or the fact that the energy introduced cannot reach all cells equally.

A performance measurement, for example a measurement of a current or a temperature measurement, in individual inductors or possibly in a group of inductors can be used to check whether the heating in the respective assigned electrode-separator assembly or in the respective assigned electrode-separator assemblies has actually been carried out optimally in the intended manner. Quality control is therefore possible via such a performance measurement, so that a sufficient and reliable heating and drying treatment can be ensured for all electrode-separator assemblies in the entire batch. Insufficient drying treatment of individual electrode-separator assemblies can also be detected in this way for the purposes of quality control and the corresponding electrode-separator assemblies can be sorted out, if necessary.

With regard to the inductors, the method is characterized by at least one of the following additional features:

a. The inductor or inductors are induction coils.
b. The diameter of the inductors used according to feature d., in particular the induction coils, and the diameter of the electrode-separator assemblies, in particular the electrode-separator assemblies that are formed as windings having the basic cylindrical shape, deviate from each other by a maximum of 20%.

In embodiments with feature d., the aforementioned features a. and b. are preferably realized in combination with one another.

In principle, all devices that are suitable for generating an alternating electric field that can induce an eddy current in a metallic substrate are suitable as inductors. Inductors are preferably induction coils, in particular coils with several coil windings, or induction devices comprising at least one such coil each. The induction coils are preferably wound in a flat, spiral shape and, in preferred embodiments, consist essentially of copper wire or coated copper wire, for example.

By adapting the diameter of the inductors, in particular the induction coils, to the diameter of the electrode-separator assemblies to be treated, effective energy utilization can be achieved. However, since the method works very efficiently overall without, certain deviations in the fit between the inductors and the electrode-separator assemblies are also acceptable. For example, a variance of 20% with the diameters mentioned is still suitable for carrying out the drying treatment very quickly and in an energy-saving manner.

If necessary, larger deviations between the diameters of the inductors and the electrode-separator assemblies may also be acceptable. This makes it possible to treat electrode-separator assemblies of different dimensions with the same drying device.

The method is suitable for a thermal drying treatment which is carried out immediately before the electrode-separator assemblies are impregnated with an electrolyte in the course of the manufacturing process of the energy storage elements. In this step in particular, i.e. before impregnation with an electrolyte, any residual moisture should be removed from the electrode-separator assemblies. The residual moisture that can be removed may, for example, have penetrated into the electrode-separator assemblies during intermediate storage of the electrode-separator assemblies during the manufacturing process. Using the method, the post-drying step can be carried out in a time- and energy-saving manner.

The method is suitable for round cells, as an optimal round coil shape of the inductors can be utilized, which corresponds to the round cross-section of a round cell.

The method is suitable for use in the production process of lithium-ion cells, preferably lithium-ion round cells, and can above all also be used in mass production. The energy and time-saving potential of the method is effective in mass production processes.

The present disclosure further provides a drying device for carrying out a thermal drying treatment, in particular according to the method described. This drying device is characterized by the following features:

a. The drying device comprises at least one vacuum chamber.
b. The drying device comprises a plurality of inductors, in particular induction coils, preferably in a regular arrangement, or it comprises at least one inductor which generates an alternating magnetic field of elongate extension, in which the more than two electrode-separator assemblies can be arranged so that they are each exposed to essentially the same magnetic field strength in the alternating field.
c. The drying device comprises at least one device for supplying a current to the inductor or inductors.

A vacuum chamber of the drying device is preferably defined by a vacuum hood, preferably by a lowerable vacuum hood, which can enclose one or more of the electrode-separator assemblies to be dried so that this or these can be subjected to a corresponding reduced pressure. In many cases, it is preferred that a plurality of electrode-separator assemblies is arranged in a vacuum chamber, i.e. is enclosed by a vacuum hood. However, the device can also comprise a separate hood for each of the electrode-separator assemblies to be dried. In this case, each of the electrode-separator assemblies is arranged in its own vacuum chamber.

With regard to further details of this drying device, reference is also made to the method described above, which can be carried out with such a drying device.

The device for supplying a current to the inductors preferably comprises a control device for the individual inductors or, if necessary, for a plurality of inductors, so that the inductors can be operated individually or in groups at a suitable alternating current frequency. Depending on the design of the drying device, it may also be possible to control all inductors at the same frequency and together.

In a preferred manner, the drying device is characterized by the following additional feature:

a. The inductor or inductors are arranged in a carrier plate of the drying device, preferably cast into the carrier plate, or arranged under a carrier plate of the drying device.

As already explained above, the inductors are preferably induction coils known per se, which are arranged in the carrier plate, for example a base plate, of the drying device. The coils can be covered by a plate or a layer of electrically non-conductive material, for example a glass ceramic. The inductors themselves are preferably flat-wound induction coils, in particular made of copper wire. If necessary, the induction coil can be equipped with a ferrite core in order to focus the magnetic field lines even better on the electrode-separator assemblies to be treated. In this case in particular, a flat winding of the induction coils is not necessary.

With regard to the feeding and positioning of the electrode-separator assemblies to be treated, the drying device is characterized in preferred embodiments by at least one of the following additional features:

a. The drying device comprises transport means for introducing and/or removing the electrode-separator assemblies to be treated into and/or from the drying device,
b. the drying device comprises means for positioning the electrode-separator assemblies to be treated relative to the inductor or the individual inductors,
c. the drying device comprises carrier means for holding the electrode-separator assemblies to be treated.

Preferably, the aforementioned features a. and b. or a. and c. or b. and c. or a. and b. and c. are realized in combination with each other.

The transport means may, for example, be one or more pushers with which the individual electrode-separator assemblies are pushed into the interior of the drying device. The inductors in or under the carrier plate of the drying device can be arranged such that, when the electrode-separator assemblies are pushed in at maximum packing of the electrode-separator assemblies, one inductor is assigned to each electrode-separator assembly or that the electrode-separator assembly is positioned directly above an inductor on the carrier plate. This precise alignment of the electrode-separator assemblies can be supported, for example, by corresponding lateral bands or stops, which simplify the correct positioning of the electrode-separator assemblies.

Correct positioning of the electrode-separator assemblies on the carrier plate of the drying device can also be supported by other means, for example with the aid of a gripper. A gripper can be used such that one or more electrode-separator assemblies are gripped and placed in the correct position on the carrier plate.

Furthermore, carrier means can be provided for holding, for example transport cups or transport pallets or similar, which facilitate positioning and holding. The carrier means can be designed as single or multiple holders for several electrode-separator assemblies. Preferably, such carrier means can be made of plastic or other non-metallic and preferably non- or low-heat-conducting materials so that they do not interact with the inductive heating. The use of such carrier means, for example transport cups, can be helpful during drying treatment of the pure electrode-separator assemblies, with or without contact elements, as this means that the sensitive electrode-separator assemblies do not have to be touched directly during the drying treatment.

Preferably, each inductor can be switched individually or, if appropriate, as part of a group, preferably in a controlled manner.

In advantageous embodiments, the drying device comprises a device for measuring the performance of the inductor or inductors, wherein, in particular in embodiments in which an inductor is assigned to each electrode-separator assembly, a performance measurement can preferably be provided for each individual inductor or, if applicable, for a group of inductors. For example, the absorbed current and/or the temperature and/or the time can be measured as a performance value. For example, a sensor for temperature measurement can be integrated in each inductor. By measuring the performance, the course of the drying treatment can in principle be recorded for each individual electrode-separator assembly and can also be tracked in terms of quality control. Such a performance measurement also allows the individual inductors to be operated in a controlled manner so that, for example, homogeneous and uniform drying treatment can be ensured over an entire batch.

A performance measurement can also be used to initially measure the amount of energy required for an electrode-separator assembly at a specific position within the batch or at a specific position on the carrier plate of the drying device. The inductor can then be set accordingly for the subsequent drying processes so that consistent drying quality is guaranteed without having to record the corresponding values for each drying process.

In further preferred embodiments of the drying device, a self-oscillating resonant converter may be associated with each inductor. For example, a self-oscillating Royer converter can be used. The resonant converter may be self or externally controlled, it generally operates efficiently regardless of the type of control and causes little EMC interference. In some embodiments, the externally controlled resonant converter is preferred as it is more controllable in terms of frequency.

Further features and advantages are apparent from the following description of examples in connection with the drawings. The individual features may be realized separately or in combination with each other.

FIG. 1 shows some components for carrying out the method, wherein a plurality of electrode-separator assemblies 10 are simultaneously subjected to a thermal drying treatment based on inductive heating. An important point of the method is that exactly one inductor 20 is assigned to each electrode-separator assembly 10 to be treated. The thermal drying treatment is carried out in a vacuum, wherein in the example shown here a vacuum hood 30 is lowered over the electrode-separator assemblies 10 to be treated within a corresponding drying device to generate the vacuum.

The electrode-separator assemblies 10 shown here, which are to be treated, are windings with a cylindrical basic shape and two terminal end faces, which are formed from ribbon-shaped electrodes and a separator located between them in a manner known per se. A plate-shaped contact element 11, 12 is located on each of the end faces of the electrode-separator assemblies 10 shown here. The contact elements 11 and 12 are each welded to the protruding longitudinal edges of the current collectors and are thus connected to the electrodes. The contact element 11 on the lower end face of the electrode-separator assembly is connected to the anode current collector. The contact element 12 on the upper side of the electrode-separator assembly 10 is connected to the cathode current collector.

When positioning the electrode-separator assemblies 10 in relation to the individual inductors 20, the anode-side contact element 11 is positioned in the effective range of the respective inductor 20 in this preferred embodiment. In this way, good inductive heat transfer is achieved, as the heating of the anode-side contact element 11 is transferred directly to the anode current collector. The anode current collector is preferably made of copper foil. Copper has good heat conduction properties, so that the thermal drying treatment is effective in this embodiment. The contact element 11 on the anode side is also preferably made of copper or nickel.

In the example shown here, inductive heating is essentially carried out from below. In principle, however, it is also possible to carry out inductive heating from above or alternatively from below and above.

FIG. 2 shows sectional views through the carrier plate 40 of a drying device with inductors 20 in the form of induction coils inserted therein.

Figure 2A:
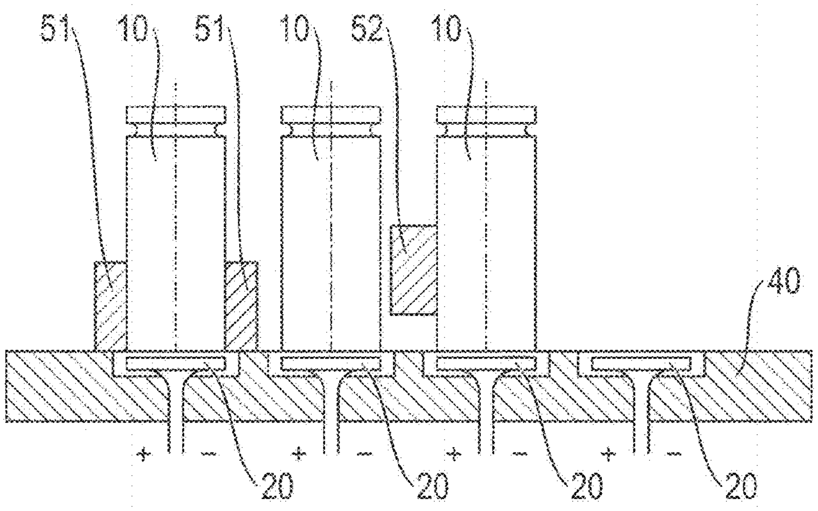
FIGS. 2A and B illustrate sectional views of inductors inserted into a carrier plate of a drying device.

FIG. 2A shows the carrier plate 40 with several induction coils 20 embedded in it. The induction coils 20 can, for example, be cast in a glass ceramic. The electrode-separator assemblies 10 to be treated are positioned above the carrier plate 40 with the induction coils 20. In the example shown here, the electrode-separator assemblies 10 are each located in a cylindrical housing cup.

To simplify the handling of the electrode-separator assemblies 10 during the drying treatment, two different carrier means 51, 52 for holding the electrode-separator assemblies are shown in the example shown here. The carrier means 51 is a product or transport cup, in particular made of plastic, which simplifies the handling and holding of the electrode-separator assembly 10. The carrier means 52 is a spacer that ensures a suitable distance between the individual electrode-separator assemblies 10 during the drying treatment and the insertion and removal of the electrode-separator assemblies 10 into and out of the drying device. In particular, this prevents the electrode-separator assemblies 10 from touching each other and possibly damaging each other.

With the aid of the holding means 51, 52, the individual electrode-separator assemblies 10 can be held upright in a simple manner. Alternatively, for example, a holding device, preferably made of plastic, can be used for a plurality of electrode-separator assemblies 10 to be treated. Such a holding device can, for example, be open at the bottom, i.e. in the direction of the inductors 20, in order to enable optimum inductive heating.

In particular, the use of appropriate holders allows the electrode-separator assemblies 10 to be positioned above the inductors 20 without contact, thereby preventing the electrode-separator assemblies from scraping over the base plate and causing damage to the electrode-separator assemblies 10.

Figure 2B:
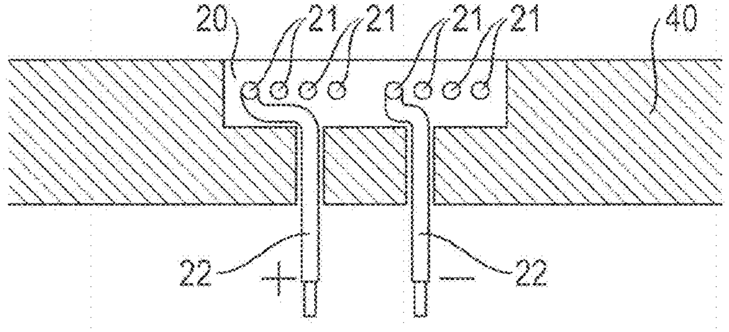

FIG. 2B shows a single induction coil 20 in detail, whereby the individual windings 21 of the induction coil 20 and the electrical connection 22 of the induction coil 20 are shown. The induction coil 20 can be operated with an alternating current, preferably in regulated form, via the electrical connection 22. For example, a ferrite core can be arranged in the center of the windings (not shown).

Figure 3:
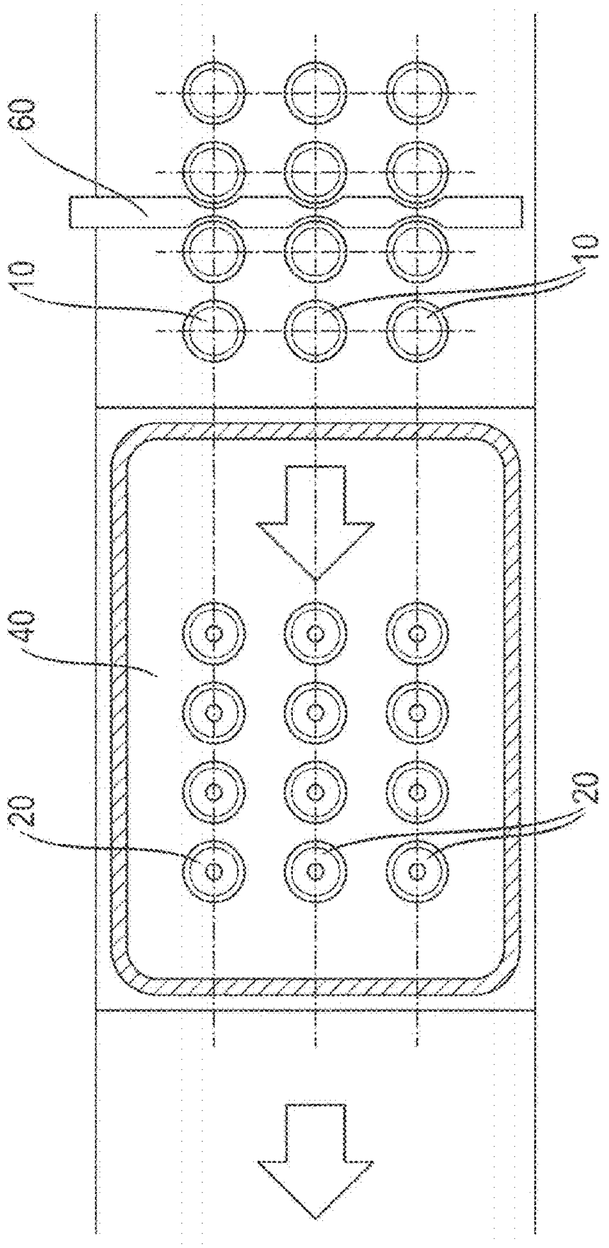
FIG. 3 illustrates a schematic view of a carrier plate of a drying device.

FIG. 3 shows a schematic top view of the carrier plate 40 of a drying device with a regular arrangement of the indicated induction coils 20. To carry out the thermal drying treatment, a corresponding number of electrode-separator assemblies 10 to be treated are positioned above these induction coils 20. For this purpose, for example, an elongated gripper element 60 with semicircular recesses is used, with which the electrode-separator assemblies 10 can be placed in the correct position on the induction coils 20, so that the drying treatment can then be carried out by supplying an alternating current with a corresponding frequency to the induction coils 10. As an alternative to a gripper system, a conveyor belt system or a pusher can also be used, for example.

In preferred embodiments, the induction coils 20 can have a ferrite core, for example in the form of a shell core half. This allows the magnetic field lines to be focused even better on the electrode-separator assembly 10 to be treated. In other embodiments, the coil core can also be open.

During the drying treatment, each induction coil 20 can preferably be controlled separately at a suitable frequency, so that the individual electrode-separator assemblies 10 can in principle be dried individually. This can be advantageous if there is a different heat distribution within the batch for a larger quantity of electrode-separator assemblies 10 to be treated.

In principle, it is also possible for several inductors or induction coils 20 to be controlled together. However, special possibilities arise from individual control of the individual inductors, which allow individual heating of the electrode-separator assemblies. In this way, for example, different requirements for heating different electrode-separator assemblies, which can be designed differently, can also be taken into account. This means, for example, that different cell variants can be optimally dried in one batch.

Figure 4:
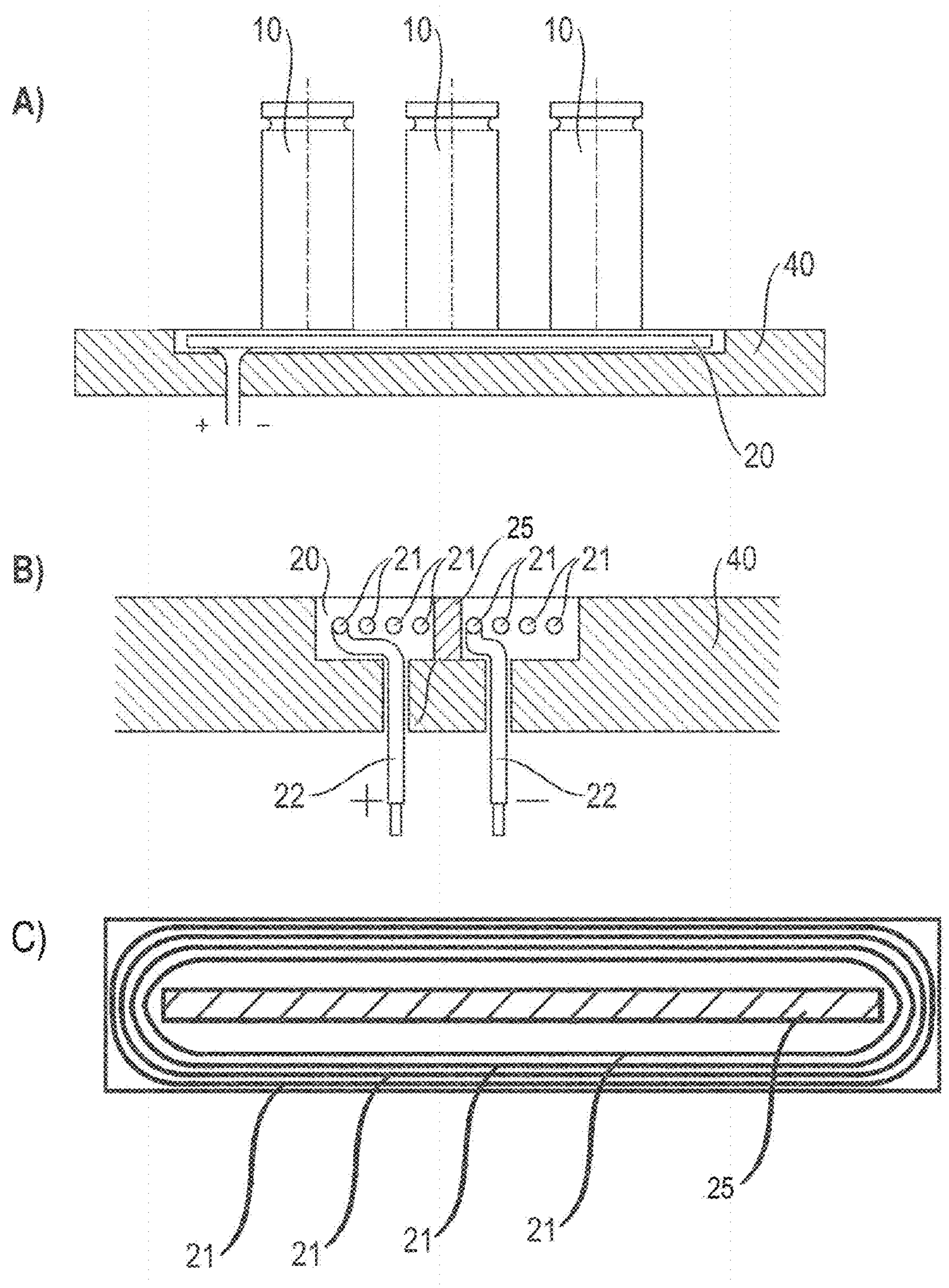
FIG. 4 illustrates sectional views of an inductor inserted into a carrier plate of a drying device.

FIG. 4 illustrates an embodiment in which more than two electrode-separator assemblies 10 are associated with an inductor 20 which generates an alternating magnetic field of elongate extent, in which the more than two electrode-separator assemblies 10 can be arranged so that they are each exposed to substantially the same magnetic field strength in the alternating field.

For this purpose, the windings 21 of a coil are wound around an elongated ferrite core 25. This provides an alternating magnetic field that is almost the same for several electrode-separator assemblies 10 arranged next to each other (see A).

FIG. 2B shows a cross-section through the arrangement shown in A in the region of the arresters 22.

FIG. 2C shows a schematic longitudinal section through the arrangement.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for thermal drying treatment of a plurality of electrode-separator assemblies, each of the plurality of electrode-separator assemblies having at least one negative electrode and at least one positive electrode, each negative electrode and each positive electrode comprising a metallic current collector coated with electrode active material, the method comprising:

positioning the plurality of electrode-separator assemblies is in a drying device in an effective range of a plurality of inductors configured to inductively heat the plurality of electrode-separator assemblies;

applying a vacuum for the thermal drying treatment; and supplying a current to the inductors, wherein:

exactly one inductor is assigned to each electrode-separator assembly of the plurality of electrode-separator assemblies to be dried in the drying device, or more than two electrode-separator assemblies are assigned to an inductor that generates an alternating magnetic field of elongate extension, in which the more than two electrode-separator assemblies can be arranged so that they are each exposed to essentially the same magnetic field strength in the alternating field, and wherein the electrode-separator assemblies are heated to a temperature above 99° C. and below a melting temperature of a separator material of the electrode-separator assemblies.

2. The method according to claim 1, wherein the electrode-separator assemblies are heated to a temperature in a range from 100° C. to 110° C.

3. The method according to claim 1, wherein at least one of:

the electrode-separator assemblies are formed as a winding and have a cylindrical basic shape with two terminal end faces, and/or the electrodes and their respective current collectors are ribbon-shaped and are spirally wound within the electrode-separator assemblies.

4. The method according to claim 3, wherein:

within the electrode-separator assemblies, a negative electrode and a positive electrode are arranged such that a longitudinal edge of an anode current collector protrudes from one of the terminal end faces and a longitudinal edge of a cathode current collector protrudes from another of the terminal end faces, and/or a contact element is attached to at least one of the end faces that covers at least 50% of the respective end face.

5. The method according to claim 3, wherein at least one of:

when positioning the plurality of electrode-separator assemblies in the drying device, the electrode-separator assemblies are aligned parallel to one another on a carrier plate of the drying device with one end face of respective electrode-separator assemblies facing the carrier plate and another end face of the respective electrode-separator assemblies facing away from the carrier plate, wherein the inductor or the inductors are arranged in the carrier plate or under the carrier plate, and/or wherein, after the plurality of electrode-separator assemblies have been positioned in the drying device, the inductor or the inductors are separated from the electrode-separator assemblies by a dielectric.

6. The method according to claim 5, further comprising at least one of:

inserting each of the plurality of electrode-separator assemblies into a cylindrical metallic housing cup having a cup base, and is inductively heated inside the housing cup, and/or placing the electrode-separator assemblies together with the metal housing cups in the drying device such that the housing bottoms of the housing cups stand on the carrier plate of the drying device.

7. The method according to claim 1, wherein at least one of:

the individual inductors are operated in a controlled manner, and/or at least one performance value in the individual inductors is measured.

8. The method according to claim 1, wherein at least one of:

the inductor or inductors are induction coils; and/or a diameter of the inductors and a diameter of the electrode-separator assemblies deviate from each other by a maximum of 20%.

9. The method according to claim 1, wherein the thermal drying treatment is carried out directly before the electrode-separator assemblies are impregnated with an electrolyte.

10. A drying device for carrying out a thermal drying treatment according to the method of claim 1, the drying device comprising:

at least one vacuum chamber;

a plurality of inductors or at least one inductor configured to generate an alternating magnetic field of elongate extension; in which the more than two electrode-separator assemblies can be arranged so that they are each exposed to essentially the same magnetic field strength in the alternating field; and at least one device for supplying a current to the inductor or inductors.

11. The drying device according to claim 10, wherein the inductor or inductors are arranged in a carrier plate of the drying device or arranged under a carrier plate of the drying device.

12. The drying device according to claim 10, further comprising at least one of:

a transport configured to introduce and/or remove the electrode-separator assemblies into and/or from the drying device, a positioning mechanism configured to position the electrode-separator assemblies to be treated relative to the inductor or inductors, and/or a carrier configured to hold the electrode-separator assemblies to be treated.

13. The drying device according to claim 10, further comprising a measurement device configured to measure the performance of the inductor or inductors.

14. The drying device according to claim 10, further comprising a self-oscillating resonant converter assigned to the inductor or to each of the inductors.

* * * * *